United States Patent
Anderson

(10) Patent No.: US 9,207,687 B2
(45) Date of Patent: Dec. 8, 2015

(54) LOW NOISE RELIEF VALVE

(71) Applicant: Parker-Hannifin Corporation, Cleveland, OH (US)

(72) Inventor: David John Anderson, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 240 days.

(21) Appl. No.: 13/737,626

(22) Filed: Jan. 9, 2013

(65) Prior Publication Data

US 2014/0020772 A1   Jan. 23, 2014

Related U.S. Application Data

(60) Provisional application No. 61/584,426, filed on Jan. 9, 2012.

(51) Int. Cl.
| | |
|---|---|
| *F16K 31/12* | (2006.01) |
| *G05D 16/10* | (2006.01) |
| *F16K 15/04* | (2006.01) |
| *F16K 15/06* | (2006.01) |
| *F16K 17/04* | (2006.01) |

(52) U.S. Cl.
CPC ............. *G05D 16/10* (2013.01); *F16K 15/044* (2013.01); *F16K 15/063* (2013.01); *F16K 17/0406* (2013.01); *Y10T 137/7794* (2015.04)

(58) Field of Classification Search
CPC . F16K 15/044; F16K 15/063; F16K 17/0406; G05D 16/10; Y10T 137/7794
USPC ............ 137/494, 497, 500, 471, 469, 505.15, 137/505.13, 505.27, 505.28, 505.42, 543.17
See application file for complete search history.

(56) References Cited

U.S. PATENT DOCUMENTS

| | | | |
|---|---|---|---|
| 2,128,253 A | | 8/1938 | Johnson et al. |
| 3,438,307 A | | 4/1969 | Ahlenius et al. |
| 3,545,484 A | * | 12/1970 | Allen ............................ 137/490 |
| 4,271,796 A | | 6/1981 | Sickler et al. |
| 4,377,179 A | * | 3/1983 | Giebeler ....................... 137/494 |
| 4,665,942 A | * | 5/1987 | Altman ......................... 137/490 |
| 4,898,206 A | * | 2/1990 | Meistrick et al. .......... 137/512.3 |
| 5,381,823 A | | 1/1995 | Dibartolo |
| 5,558,121 A | * | 9/1996 | Webster et al. ............... 137/511 |
| 5,992,450 A | | 11/1999 | Parker et al. |
| 6,662,886 B2 | * | 12/2003 | Russell ......................... 175/218 |
| 2008/0283130 A1 | * | 11/2008 | Arnott ........................... 137/494 |

* cited by examiner

*Primary Examiner* — Jessica Cahill
(74) *Attorney, Agent, or Firm* — Henner, Otto, Boisselle & Sklar, LLP

(57) ABSTRACT

A relief valve includes a valve body having an inlet and an outlet; a passageway formed between the inlet and the outlet in the valve body; a valve tube positioned in the passageway having a generally cylindrical portion including a first outside diameter and a second generally cylindrical portion including a first inside diameter that is larger than the first outside diameter; a valve seat; and a spring positioned about at least a portion of the valve tube and biasing the valve tube away from the valve inlet to seal against the valve seat. The valve tube and valve seat prevent flow through the passageway when pressure at the inlet is below a predetermined pressure and wherein the valve tube moves axially away from the valve seat at the predetermined pressure allowing flow through the passageway from the inlet to the outlet.

15 Claims, 1 Drawing Sheet

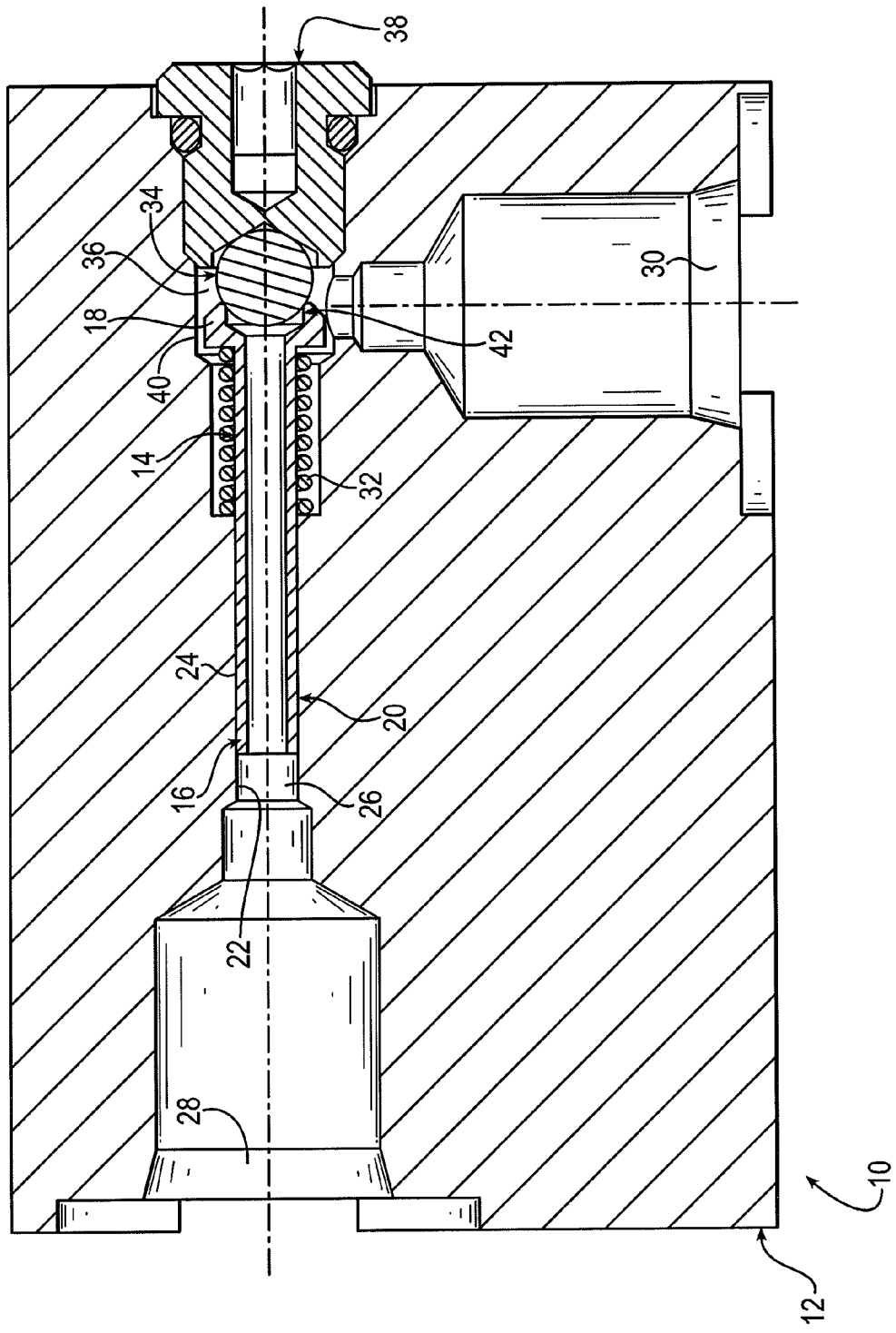

LOW NOISE RELIEF VALVE

RELATED APPLICATIONS

This application claims the benefit of U.S. Provisional Application No. 61/584,426 filed Jan. 9, 2012, which is hereby incorporated herein by reference.

FIELD OF INVENTION

The present invention relates generally to a relief valve, and more particularly to a direct-acting, differential piston type relief valve.

BACKGROUND

Direct-acting, differential piston relief valves are used to provide a quick opening for excessive hydraulic pressure. They are characterized by a structure in which the regulated hydraulic pressure is applied directly to a primary piston area.

SUMMARY OF INVENTION

A primary problem with currently available differential relief valves is they are complex and noisy. An exemplary valve improving on these known valves includes a primary piston area that may be annular and may be measured in terms of the difference in areas resulting from the piston seating area and either the piston outside diameter or a defined smaller internal diameter. By this method, a large seating diameter is achieved—providing good flow capacity—and operating forces are reduced to provide high pressure capability in a reasonably small package. The force exerted on the piston annular area as a result of the hydraulic pressure tends to move the piston away from the source of the pressure, thereby unseating the valve to relieve the pressure. This opening pressure may be opposed by a spring. Appropriate selection of the spring force and piston areas will provide a relief valve which will theoretically open at a desired pressure and close when the pressure falls below it.

In particular, according to one aspect of the invention, a relief valve includes a valve body having an inlet and an outlet; a passageway formed between the inlet and the outlet in the valve body; a valve tube positioned in the passageway having a generally cylindrical portion including a first outside diameter and a second generally cylindrical portion including a first inside diameter that is larger than the first outside diameter; a valve seat; and a spring positioned about at least a portion of the valve tube and biasing the valve tube away from the valve inlet to seal against the valve seat. The valve tube and valve seat prevent flow through the passageway when pressure at the inlet is below a predetermined pressure and wherein the valve tube moves axially away from the valve seat at the predetermined pressure allowing flow through the passageway from the inlet to the outlet.

Optionally, the valve seat comprises a ball seated against the second portion of the tube.

Optionally, the ball is secured in the valve body by a valve plug.

Optionally, the ball is positioned in a cone-shaped portion of the plug to prevent lateral movement of the ball.

According to another aspect of the invention a relief valve includes a valve body having a bore between an inlet and an outlet; a counterbore coaxial with and downstream of the bore; a generally tubular valve member axially moveable within the bore and including a tube portion and a seat portion, the tube portion having an outside diameter approximately equal to a diameter of the bore and extending therein, the seat portion having an inside diameter larger than the outside diameter; a valve seat; and a spring positioned in the counterbore and biasing the valve member against the valve seat to form a seal thereat.

Optionally, the valve seat comprises a ball seated against the seat portion of the valve member.

Optionally, the ball is secured in the valve body by a valve plug.

Optionally, the ball is positioned in a cone-shaped portion of the plug to prevent lateral movement of the ball.

The foregoing and other features of the invention are hereinafter described in greater detail with reference to the accompanying drawings.

BRIEF DESCRIPTION OF THE DRAWINGS

FIG. 1 is a cross-sectional view of an exemplary low noise relief valve.

DETAILED DESCRIPTION

Referring to FIG. 1, shown is a cross-sectional view of an exemplary valve assembly 10. The valve comprises five parts which could be designed into a manifold, power unit, or electrohydraulic actuator, or any other appropriate application. Herein, the valve is shown and described with a valve body 12. Although the valve body 12 may take various forms, the exemplary embodiment is shown as a test housing for purposes of clarity.

The generally tubular valve member (or valve tube) 14, including a tube portion 16 and a seat portion 18, is axially moveable in a bore 20 of the valve body 12 having. The diameter 22 of the bore 20 is approximately equal to the outer diameter 24 of the tube portion 16. The bore 20 forms part of a fluid passageway 26 between the inlet 28 and the outlet 30 of the valve assembly 10.

The valve member 14 may be held in position by a compression spring 32 against a valve seat, which may be, for example, a steel ball 34 which is held in a cavity 36 by a plug 38. The compression spring 32 may extend around at least a section of the tube portion 16 and may be positioned, for example, in a counterbore 40 downstream of the inlet 28. Specifically, the spring may be positioned against a ledge formed by the counterbore 40 and extend between the ledge of the counterbore and a back side of the seat portion 18 of the valve member 14.

The seat member 18 seals against the valve seat 34 and has an inner diameter 42 exposed to pressure in the fluid passageway 26, which is larger than the outer diameter of the tube portion 16 also exposed to pressure in the passageway 26. As pressure increases at the inlet 28, force increases on the valve member 14 in opposition to the compression spring 32 because of the differential area between the exposed diameters 24, 42 of the valve member 14. When this hydraulic force equals the spring force, the relief valve member 14 will begin to unseat from the valve seat 34, thereby limiting the pressure upstream of the valve member by allowing fluid to flow through the valve member to the outlet 30.

The bore 20, counterbore 40, and cavity 36 for the components may be machined from one side in one setup resulting in good alignment of the components.

The tube portion 16 of the valve member 14 may be long with a close fit to the housing 12 resulting in low leakage, and limited motion except along its axis.

This tight fit adds to the valve's stability and low noise.

The ball 34 may be held in position by a cone shape in the plug 38 which limits motion of the ball 34 and adds to valve stability.

The components are simple to manufacture resulting in low cost. The valve as shown is a fixed pressure setting, but an adjustable pressure design could be made with different plug design.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A relief valve comprising:
   a valve body having an inlet and an outlet;
   a passageway formed between the inlet and the outlet in the valve body;
   a valve tube positioned in the passageway having a generally cylindrical portion including a first outside diameter and a second generally cylindrical portion including a first inside diameter that is larger than the first outside diameter;
   a valve seat; and
   a spring positioned about at least a portion of the valve tube and biasing the valve tube away from the valve inlet to seal against the valve seat;
   wherein the valve tube and valve seat prevent flow through the passageway when pressure at the inlet is below a predetermined pressure and wherein the valve tube moves axially away from the valve seat at the predetermined pressure allowing flow through the passageway from the inlet to the outlet,
   wherein the valve seat comprises a ball seated against the second portion of the tube.

2. The relief valve of claim 1, wherein the ball is non-foraminous.

3. The relief valve of claim 1, wherein the valve tube is closefitting to the valve body, tending to prevent leakage and limit non-axial motion.

4. The relief valve of claim 1, wherein the valve tube extends along the passageway for a length longer that the first outside diameter.

5. The relief valve of claim 1, wherein the ball is secured in the valve body by a valve plug.

6. The relief valve of claim 5, wherein the ball is positioned in a cone-shaped portion of the plug to prevent lateral movement of the ball.

7. The relief valve of claim 1, wherein the outlet is inclined with respect to the inlet.

8. The relief valve of claim 7, wherein the inlet is orthogonal to the outlet.

9. A relief valve comprising:
   a valve body having a bore between an inlet and an outlet;
   a counterbore coaxial with and downstream of the bore;
   a generally tubular valve member axially moveable within the bore and including a tube portion and a seat portion, the tube portion having an outside diameter approximately equal to a diameter of the bore and extending therein, the seat portion having an inside diameter larger than the outside diameter;
   a valve seat; and
   a spring positioned in the counterbore and biasing the valve member against the valve seat to form a seal thereat,
   wherein the valve seat comprises a ball seated against the seat portion of the valve member, and
   wherein the ball is non-foraminous.

10. The relief valve of claim 9, wherein the tube portion of the valve member is closefitting to the body, tending to prevent leakage and limit non-axial motion.

11. The relief valve of claim 9, wherein the outlet is inclined with respect to the inlet.

12. The relief valve of claim 11, wherein the inlet is orthogonal to the outlet.

13. The relief valve of claim 9, wherein the tube portion of the valve member extends along the bore for a length longer that the outer diameter.

14. The relief valve of claim 5, wherein the ball is secured in the valve body by a valve plug.

15. The relief valve of claim 14, wherein the ball is positioned in a cone-shaped portion of the plug to prevent lateral movement of the ball.

\* \* \* \* \*